United States Patent [19]

Iida

[11] 4,071,108
[45] Jan. 31, 1978

[54] STEERING SYSTEM FOR ARTICULATED VEHICLES

[75] Inventor: Akio Iida, Kawasaki, Japan

[73] Assignee: Kabushiki Kaisha Komatsu Seisakusho, Tokyo, Japan

[21] Appl. No.: 753,227

[22] Filed: Dec. 22, 1976

Related U.S. Application Data

[63] Continuation-in-part of Ser. No. 673,942, April 5, 1976, abandoned.

[30] Foreign Application Priority Data

Apr. 4, 1975 Japan .............................. 50-44792[U]
Apr. 4, 1975 Japan .............................. 50-44793[U]

[51] Int. Cl.² ............................................. B62D 5/06
[52] U.S. Cl. ...................................... 180/139; 91/388
[58] Field of Search ............... 180/134, 135, 136, 137, 180/138, 139; 91/388, 411 R; 60/464, 420, 461

[56] References Cited

U.S. PATENT DOCUMENTS

| 2,936,038 | 5/1960 | Rockwell | 180/135 |
| 3,444,948 | 5/1969 | Bianchetta | 180/139 |
| 3,872,773 | 3/1975 | Denker | 91/388 |
| 3,952,825 | 4/1976 | Beyers | 91/388 |

Primary Examiner—Joseph F. Peters, Jr.
Assistant Examiner—R. Schrecengost
Attorney, Agent, or Firm—Armstrong, Nikaido & Marmelstein

[57] ABSTRACT

An articulated vehicle has a pair of hydraulic steering cylinders for causing angular motion of a forward vehicle portion relative to its rearward portion under the control of a steering control valve which is actuated from a steering wheel via a linkage system. Arranged between the steering cylinders and the steering control valve are a pair of flow dividers which upon actuation of the steering cylinders operate to selectively deliver part of the hydraulic fluid drained therefrom to the opposed fluid chambers of a follow-up cylinder having its piston rod coupled to the linkage system. The follow-up cylinder when thus actuated causes the linkage system to return the steering control valve to neutral. In an alternate embodiment of the invention the flow dividers are replaced by hydraulic motors which on selective actuation drive respective pumps communicating with the fluid chambers of the follow-up cylinder.

9 Claims, 4 Drawing Figures

STEERING SYSTEM FOR ARTICULATED VEHICLES

BACKGROUND OF THE INVENTION

This application is a continuation in part applicaiton of the Ser. No. 673,942 filed Apr. 5, 1976 now abandoned.

This invention relates to steering systems, and in particular to a fluid steering system for articulated vehicles such as those for construction and industrial applications.

In a typical conventional steering system for an articulated vehicle having forward and rearward portions pivotally coupled to each other, a pair of steering cylinders are arranged on opposite sides of the rearward vehicle portion and have their piston rods coupled to respective linkages extending between the forward and rearward vehicle portions. Under the control of a steering control valve actuated from a steering wheel, the steering cylinders are selectively actuated to cause angular displacement of the forward vehicle portion relative to its rearward portion. Each time the vehicle is steered, the angle between its forward and rearward poritons is sensed mechanically, and a linkage between the steering wheel and the steering control valve is correspondingly actuated by a follow-up mechanism so as to cause the steering control valve to return automatically to neutral.

This prior art steering mechanism has serious drawbacks in connection with its mechanical follow-up means, which are inevitably complex in configuration and make large space requirement.

More recently, it has been proposed to arrange an angle sensor cylinder between the forward and rearward portions of an articulated vehicle so that its piston rod may be extended and contracted in accordance with the angle between the two vehicle portions. The opposed fluid chambers of this angle sensor cylinder are in communication with the respective fluid chambers of a follow-up cylinder having its piston rod coupled to the linkage between the steering wheel and the steering control valve. The linkage can therefore be actuated by the follow-up cylinder in accordance with the angle between the forward and rearward vehicle portions, for automatically returning the steering control valve to neutral.

The noted drawbacks of the first described conventional steering system are nonexistent in this second example of the prior art. Since the angle sensor cylinder is connected between the forward and rearward vehicle portions, however, the forward portion can be turned only through a narrowly limited angle relative to the rearward portion.

SUMMARY OF THE INVENTION

It is therefore an object of this invention to provide an improved fluid steering system for articulated vehicles which thoroughly overcomes the listed deficiencies of the prior art.

Briefly, the invention is directed to a steering system of the type having fluid actuated steering cylinder means adapted to cause angular motion of a forward portion of an articulated vehicle relative to its rearward portion as dictated by a steering member such as the usual handwheel. The steering system according to the invention comprises a steering control valve adapted to control communication between the steering cylinder means and a source of fluid under pressure. The steering control valve takes the form of a three-position normally closed valve, connected via linkage means to the steering member for actuation thereby. A fluid actuated follow-up cylinder has its piston rod coupled to the linkage means, and the piston of this follow-up cylinder is normally locked against movement in either direction by locking means. Operatively connected between the steering control valve and the steering cylinder means is follow-up cylinder actuating means for selectively supplying fluid under pressure to the opposed fluid chambers of the follow-up cylinder upon actuation of the steering cylinder means. The aforesaid locking means is adapted to unlock the follow-up cylinder piston when the fluid pressure in either of its fluid chambers builds up to a predetermined degree. The follow-up cylinder when thus actuated functions to cause the linkage means to return the steering control valve to its neutral position.

According to a preferred embodiment of this invention hereinbelow described, the follow-up cylinder actuating means comprises a pair of flow dividers adapted to deliver to the respective fluid chambers of the follow-up cylinder part of the fluid drained from the steering cylinder means on actuation. In another embodiment of the invention a pair of fluid actuated motors are employed in lieu of the flow dividers, the motors being selectively actuated substantially concurrently with the steering cylinder means for driving respective pumps or like sources of fluid under pressure communication with the respective fluid chambers of the follow-up cylinder.

As will be apparent, both the flow dividers and the motors with the pressurized fluid sources can be arranged in convenient positions on the articulated vehicle, with no large installation space required, so that the above noted deficiencies of the prior art can be eliminated.

The invention with further objects, features and advantages thereof will best be understood from a consideration of the following description of preferred embodiments taken in conjunction with the accompanying drawings wherein like reference characters refer to like parts throughout.

DESCRIPTION OF THE PREFERRED EMBODIMENTS

Figure 1:
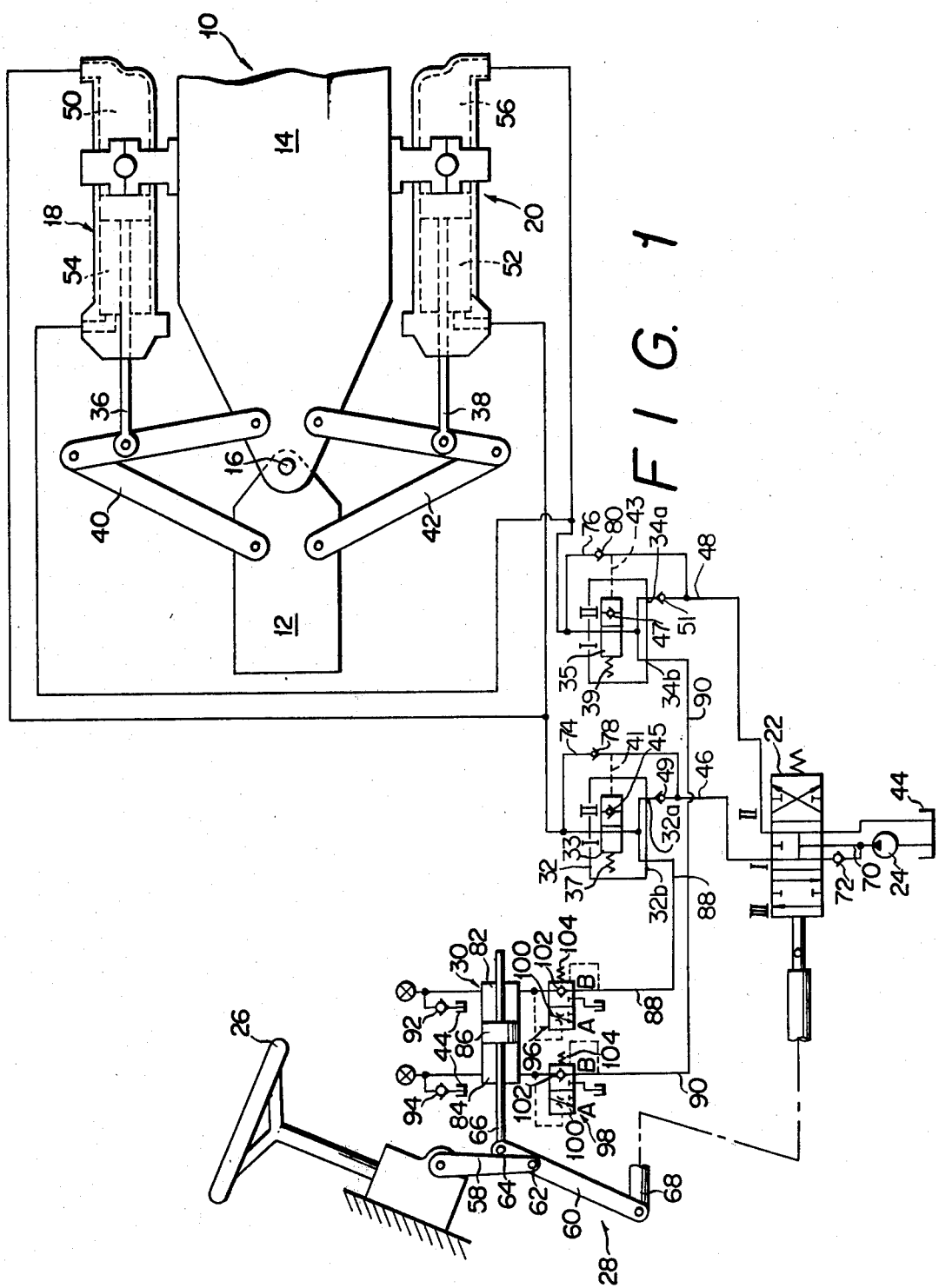
FIG. 1 is a schematic representation of a preferred form of the steering system according to this invention, including a partial plan view of an articulated vehicle with a pair of steering cylinders and associated linkages mounted thereon, a diagram of a hydraulic circuit, and a side view of a steering wheel and an associated linkage.

With reference to FIG. 1 the steering system according to the invention is therein shown adapted for an articulated vehicle 10 having a forward portion 12 and a rearward portion 14 pivotally connected to each other by a vertical pivot pin 16. The illustrated steering system broadly comprises a pair of steering cylinders 18 and 20 for causing angular motion of the forward portion 12 of the vehicle relative to its rearward portion 14, a steering control velve 22 for controlling communication between the steering cylinders and a source of fluid under pressure such as a pump 24, a steering member such as a handwheel 26 operatively connected to the steering control valve via a linkage system 28, a follow-up cylinder 30 operatively connected to the linkage system, and a pair of flow dividers 32 and 34 for actuating the follow-up cylinder in a controlled manner in response to the actuation of the steering cylinders.

The steering cylinders 18 and 20 are both of the double-acting type and are pivotally supported on the opposite sides of the rearward vehicle portion 14. The piston rods 36 and 38 of these steering cylinders are pivotally coupled to conventional steering linkages 40 and 42, respectively, that are operatively interconnected between the forward and rearward vehicle portions 12 and 14. The steering cylinders 18 and 20 are thus adapted to steer the articulated vechile 10 by the coordinated extension and contraction of their piston rods 36 and 38, as will become more clearly apparent hereinbelow.

The pump 24 draws fluid, preferably hydraulic oil, from a reservoir 44 and discharges the pressurized fluid into either of lines 46 and 48 under the control of the steering control valve 22. The line 46 communicates the pump 24 with the head end chamber 50 of the right hand steering cylinder 18 and with the rod end chamber 52 of the left hand steering cylinder 20. The line 48 communicates the pump 24 with the rod end chamber 54 of the right hand steering cylinder 18 and with the head end chamber 56 of the left hand steering cylinder 20.

The linkage system 28 extending between the steering wheel 26 and the steering control valve 22 comprises a pitman arm 58 adapted to swing back and forth in step with the revolution of the steering wheel in either direction. The pitman arm 58 is pivotally connected to a link 60 at an intermediate point 62 of the latter, and this link has one of its ends pivotally connected at 64 to the piston rod 66 of the follow-up cylinder 30, so that the link 60 is pivotable about either of the axes at 62 and 64. The other end of the link 60 is pivotally connected to another link 68 which can be suitably connected to the steering control valve 22 for actuating same in accordance with the pivotal motion of the link 60.

The steering control valve 22 is a three-position selector valve having a center or neutral position I, where the valve is closed, and offset positions II and III. In the illustrated embodiment the clockwise turn of the steering wheel 26 results in displacement of the steering control valve 22 to its offset position II, where fluid is pumped into the rod end fluid chamber 54 of the right hand steering cylinder 18 and the head end fluid chamber 56 of the left hand steering cylinder 20 by way of pump output line 70, check valve 72 and line 48. The articulated vehicle 10 is thereupon steered to the right.

Upon counterclockwise turn of the steering wheel 26, on the other hand, the steering control valve 22 is displaced to its offset position III. Fluid is then pumped into the head end fluid chamber 50 of the right hand steering cylinder 18 and the rod end fluid chamber 52 of the left hand steering cylinder 20 by way of pump output line 70, check valve 72 and line 46. The articulated vehicle is thereupon steered to the left.

For actuation of the follow-up cylinder 30 the pair of flow dividers 32 and 34 are operatively connected to the respective lines 46 and 48, and these lines have bypasses 74 and 76 connected thereto around the respective flow dividers. The bypasses 74 and 76 have respective check valves 78 and 80 designed to prevent the flow therethrough of the fluid drained from the steering cylinders 18 and 20.

Pilot operated selector valves 33 and 35 are disposed in the flow dividers 32 and 34, respectively. The selector valves 33 and 35 are normally held first position I permitting the fluid from the fluid chambers of the steering cylinders 18 and 20 to pass therethrough.

When the fluid from the pump 24 flows in the line 74, the selector valve 33 is operated by a pilot line 41 and brought into its second or offset position II with a built-in check valve 45 against the bias of the spring 37, thus blocking the fluid from the line 74 to pass therethrough. Similarly, when the fluid from the pump 24 flows in the line 76, the selector valve 35 is operated by a pilot line 43 and brought into its second or offset position II with a built-in check valve 47 against the bias of the spring 39, thus blocking the fluid from the line 76 to pass therethrough.

Thus, the pressurized fluid discharged by the pump 24 via the steering control valve 22 is caused to bypass the flow divider 32 or 34 as it flows toward the steering cylinders 18 and 20, but the fluid returning from the steering cylinders is directed into either of the flow dividers. The flow dividers 32 and 34 have first and second outlet ports 32a and 32b, and 34a and 34b, respectively. The first outlet ports 32a and 34a are drain ports, communicating with the respective lines 46 and 48 via check valves 49 and 51, respectively.

The follow-up cylinder 30 is also of the double-acting type, having a pair of fluid chambers 82 and 84 defined on opposite sides of its piston 86. These opposed fluid chambers 82 and 84 are in communication, on the one hand, with the second outlet ports 32b and 34b of the flow dividers 32 and 34 via lines 88 and 90, respectively, and on the other hand, with the reservoir 44 via respective suction valves 92 and 94. Connected to the respective lines 88 and 90 are locking valves 96 and 98 each in the form of a pilot-operated two-position selector valve. Each locking valve 96 or 98 has a first or drain position A, where the valve has a restriction 100, and a second or normal position B, where the valve has a built-in check valve 102 designed to prevent fluid flow out of the corresponding fluid chamber of the follow-up cylinder 30. The locking valves 96 and 98 are normally held in the second position B by respective springs 104.

The locking valves 96 and 98 of the foregoing construction are effective to normally lock the piston 86 of the follow-up cylinder 30 in the illustrated central position. When the steering wheel 26 is turned to cause pivotal motion of the pitman arm 58, therefore, the link 60 of the linkage system 28 is pivoted about the axis at 64 for actuation of the steering control valve 22 to either of its offset positions II and III. When fluid pressure in either of the fluid chambers 82 and 84 builds up to a predetermined degree, one of the locking valves 96 and 98 becomes shifted to its first position A against the bias of the spring 104 thereby permitting extension or contraction of the piston rod 66 of the follow-up cylinder.

OPERATION

With the steering control valve 22 neutralized as represented by FIG. 1, the steering system is conditioned for the straight-ahead travel of the articulated vehicle 10.

When the steering wheel 26 is turned clockwise, the pitman arm 58 of the linkage system 28 is pivoted clockwise as viewed in the drawing. Since then the piston 86 of the follow-up cylinder 30 is held locked in the illustrated central position by the locking valves 96 and 98 as aforesaid, the link 60 is also pivoted clockwise about the axis at 64, with the result that the steering control valve 22 is displaced to its offset position II.

With the steering control valve in its offst position II, the pressurized fluid from the pump 24 is supplied by way of line 70, check valve 72, line 48 and bypass 76 with its check valve 80 into the rod end fluid chamber 54 of the right hand steering cylinder 18 and into the head end fluid chamber 56 of the left hand steering cylinder 20, thereby causing contraction of the right hand cylinder piston rod 36 and extension of the left hand cylinder piston rod 38. At the same time, pilot operated selector valve 35 is operated by the pilot line 43 and brought into its second position II to block the fluid from the line 76 to pass therethrough. The forward portion 12 of the articulated vehicle 10 is thus angled to the right relative to its rearward portion 14 about the pivot pin 16, so that the vehicle will make a rightward turn as it is propelled.

Part of the fluid discharged in the above instance out of the head end fluid chamber 50 of the right hand steering cylinder 18 and the rod end fluid chamber 52 of the left hand steering cylinder 20 is drained as it flows out of the first outlet port 32a of the flow divider 32. The remainder of the return fluid, flowing out of the second outlet port 32b of the flow divider 32, is directed into the right hand fluid chamber 82 of the follow-up cylinder 30 via the locking valve 96 in its second position B.

When the fluid pressure in the right hand fluid chamber 82 of the follow-up cylinder 30 reaches a predetermined value, the locking valve 98 is displaced to its first position A against the bias of the spring 104 thereby venting the left hand fluid chamber 84 of the follow-up cylinder to the reservoir via the restriction 100. The piston 86 of the follow-up cylinder 30 is thus shifted to the left from its illustrated central position.

Since the pitman arm 58 is now locked against movement in either direction, the extension of the piston rod 66 of the follow-up cylinder 30 results in pivotal motion of the link 60 in the counterclockwise direction about the axis at 62. The steering control valve 22 is thus shifted back to its center position I to block communication between the pump 24 and the steering cylinders 18 and 20.

It will be apparent that upon counterclockwise turn of the steering wheel 26, the steering control valve 22 is displaced to its offset position III and is subsequently returned to neutral through substantially the same procedure as above.

As will be appreciated, the fluid for actuating the follow-up cylinder 30 recirculates through the hydraulic circuit, instead of flowing to and fro within closed paths as has been the case heretofore. There is practically no possibility of air being trapped within the hydraulic circuit, so that the reliability of the follow-up cylinder is enhanced.

SECOND FORM

Figure 2:
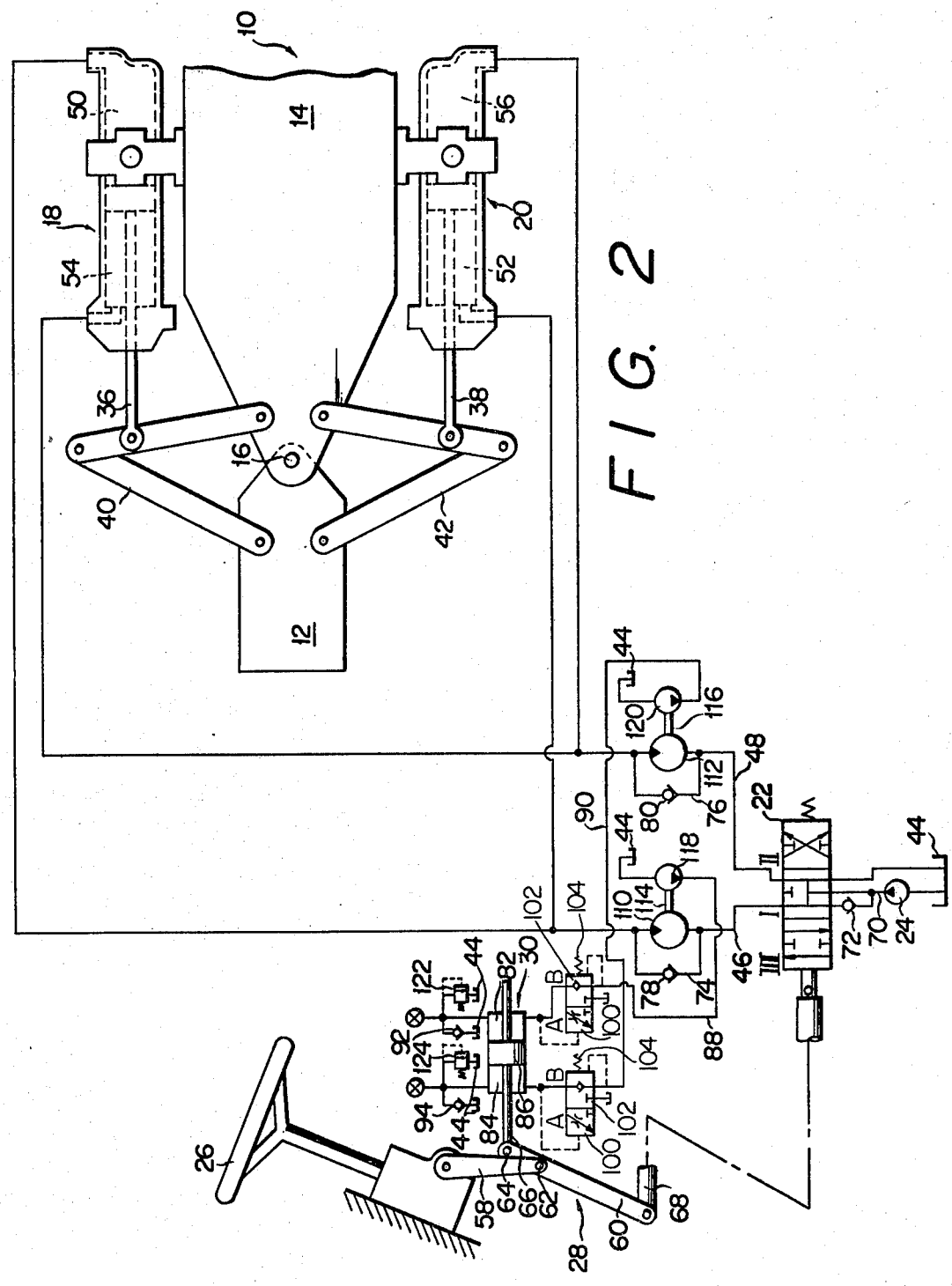
FIG. 2 is a similar schematic representation of another preferred embodiment of the invention.

An alternate embodiment of the invention is illustrated in FIG. 2 wherein different means are employed for actuating the follow-up cylinder 30 upon actuation of the pair of steering cylinders 18 and 20. Instead of the flow dividers a pair of fluid actuated motors 110 and 112 are operatively connected to the respective lines 46 and 48 communicating the steering control valve 22 with the pair of steering cylinders 18 and 20 as above described.

These motors 110 and 112 have output shafts 114 and 116 coupled in driving relationship to respective pumps 118 and 120 or like sources of pressurized fluid. The pumps 118 and 120 are adapted to draw fluid from the reservoir 44 and to supply the pressurized fluid into the respective fluid chambers 82 and 84 of the follow-up cylinder 30 by way of the lines 88 and 90 having the locking valves 96 and 98.

As in the preceding emvodinent the lines 46 and 48 have the bypasses 74 and 76 connected thereto around the respective motors 110 and 112. The bypasses 74 and 76 have the check valves 78 and 80 designed to prevent the flow therethrough of fluid drained from the steering cylinders 18 and 20. The motors 110 and 112 are therefore rotated only by the fluid returning under pressure from the steering cylinders 18 and 20.

The alternate embodiment of FIG. 2 further differs from the preceding embodinent in that the opposed fluid chambers 82 and 84 of the follow-up cylinder 30 are in communication with the reservoir 44 via respective relief valves 122 and 124, besodes communicating therewith via the respective suction valves 92 and 94 as in the preceding embodiment. Other details of construction are exactly as set forth above in connection with FIG. 1.

OPERATION OF SECOND FORM

Upon clockwise turn of the steering wheel 26, the steering control valve 22 is displaced as aforesaid to its offset position II. The pressurized fluid from the pump 24 is then supplied into the rod end fluid chamber 54 of the right hand steering cylinder 18 and the head end fluid chamber 56 of the left hand steering cylinder 20, thereby causing contraction of the right hand cylinder piston rod 36 and extension of the left hand cylinder piston rod 38. The forward portion 12 of the articulated vehicle 10 is thus angled to the right relative to its rearward portion 14 about the pivot pin 16, so that the vehicle will make a rightward turn as it is propelled.

The fluid discharged in the above instance out of the head end fluid chamber 50 of the right hand steering cylinder 18 and the rod end fluid chamber 52 of the left hand steering cylinder 20 is drained back to the reservoir by passing through the motor 110. Thus actuated, the motor 110 drives the pump 118, so that the pump draws fluid directly from the reservoir 44 for supply of the pressurized fluid into the right hand fluid chamber 82 of the follow-up cylinder 30 via the locking valve 96 in its second position B.

The steering control valve 22 can therefore be shifted back to its center position I through the procedure set forth in the foregoing description of operation of the first embodiment of the invention. It will be apparent that the steering control valve 22 can likewise be returned to neutral after leftward turn of the vehicle, as then the fluid drained from the steering cylinders 18 and 20 actuates the other motor 112 thereby causing same to drive the pump 120.

MODIFIED FORMS

Figure 3:
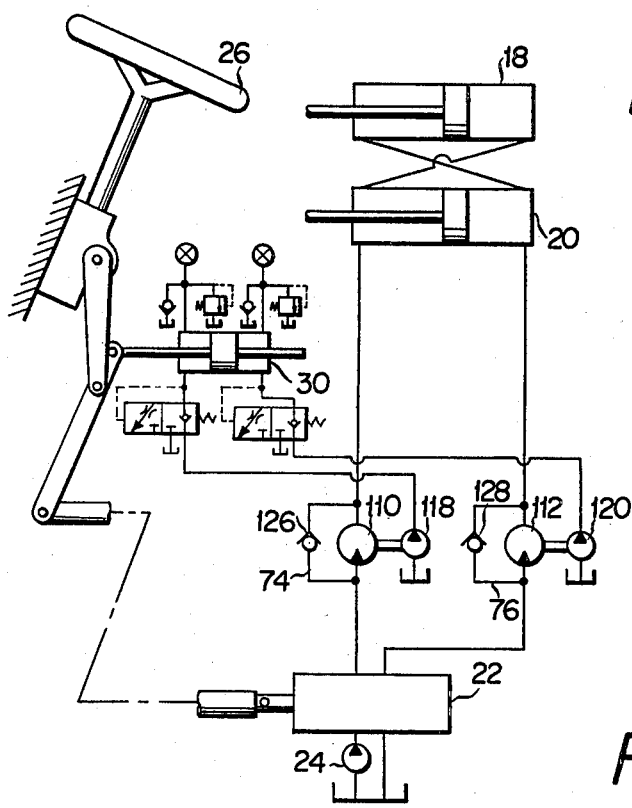
FIG. 3 is also a schematic representation of a slight modification of the embodiment of FIG. 2, the vehicle being not shown in FIG. 3 to facilitate illustration.

In a slight modification of the FIG. 2 embodiment illustrated in FIG. 3, the bypasses 74 and 76 connected around the motors 110 and 112 have check valves 126 and 128 so arranged as to permit the passage therethrough of only the fluid drained from the steering cylinders 18 and 20. In this manner the motors 110 and 112 will be actuated by the pressurized fluid being delivered by the pump 24 toward the steering cylinders 18 and 20. Other details of construction and operation are identical with those set forth above in connection with FIG. 2.

Figure 4:
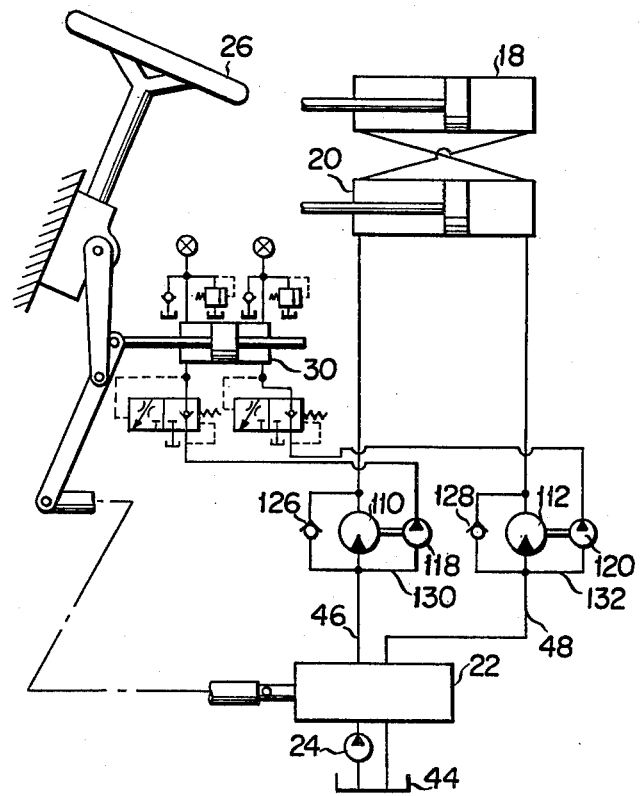
FIG. 4 is a schematic representation similar to FIG. 3 but showing another slight modification.

FIG. 4 illustrates a slight modification of the FIG. 3 embodiment, wherein the pumps 118 and 120 have their inlet ports communicated with the lines 46 and 48 by way of lines 130 and 132, respectively, instead of being communicated directly with the reservoir 44 as in the embodiment shown in FIGS. 2 and 3. In this manner the pumps 118 and 120 when driven by the motors 110 and 112 will draw part of the pressurized fluid which has been discharged by the pump 24 for supply into the steering cylinders 18 and 20.

While the present invention has been shown and described in terms of specific embodiments thereof, it is not desired to limit the invention to the exact showing of the drawings or the description thereof. For instance, the output shafts 114 and 116 of the motors 110 and 112 may be coupled to the pumps 118 and 120 via one-way clutches so that the pumps may be driven when the motors are actuated either by the pressurized fluid from the pump 24 or by the fluid returning under pressure from the steering cylinders 18 and 20. This and numerous other variations which will readily occur to those skilled in the art are intended in the foregoing disclosure, so that the invention should be construed broadly and in a manner consistent with the fair meaning or proper scope of the following claims.

What is claimed is:

1. In a steering system for an articulated vehicle having a forward portion and a rearward portion pivotally connected to each other, wherein the steering system includes fluid actuated steering cylinder means adapted to cause angular motion of the forward portion of the vehicle relative to its rearward portion as dictated by a steering member, the combination thereof with:
    a source of fluid under pressure;
    a steering control valve adapted to control communication between said source and said steering cylinder means, said steering control valve being normally held closed in a center position and displaced on actuation to either of two offset positions;
    linkage means operatively connecting said steering member to said steering control valve whereby said steering control valve is actuated by said steering member;
    a fluid actuated follow-up cylinder having a piston operatively connected to said linkage means via a piston rod, said follow-up cylinder having a pair of opposed fluid chambers;
    locking means for normally locking said piston of said follow-up cylinder against movement in either direction; and
    follow-up cylinder actuating means operatively connected between said steering control valve and said steering cylinder means to selectively supply fluid under pressure to said fluid chambers of said follow-up cylinder upon actuation of said steering cylinder means, said locking means being adapted to unlock said piston of said follow-up cylinder when the fluid pressure in either of its fluid chambers builds up to a predetermined degree;
    whereby said follow-up cylinder when actuated by said actuating means functions to cause said linkage means to return said steering control valve to its center position.

2. The steering system as recited in claim 1, wherein said follow-up cylinder actuating means comprises a pair of flow dividers adapted to supply to the respective fluid chambers of said follow-up cylinder part of the fluid returning from said steering cylinder means to said steering control valve.

3. The steering system as recited in claim 1, wherein said locking means comprises a pair of locking valves operatively connected between said follow-up cylinder actuating means and the respective fluid chambers of said follow-up cylinder.

4. The steering system as recited in claim 3, wherein each of said locking valves is a pilot-operated two-position selector valve having a normal position where the selector valve has a built-in check valve permitting the flow therethrough of only the fluid supplied from said follow-up cylinder actuating means, each selector valve also having a drain position for permitting the drainage of fluid from the corresponding one of said fluid chambers of said follow-up cylinder.

5. The steering system as recited in claim 1, wherein said follow-up cylinder actuating means comprises a pair of fluid actuated motors adapted to be selectively actuated substantially concurrently with said steering cylinder means, and a pair of second sources of fluid under pressure adapted to be driven by the respective motors for supplying fluid under pressure to the respective fluid chambers of said follow-up cylinder.

6. The steering system as recited in claim 5, including a pair of lines operatively communicating said steering control valve with said steering cylinder means, said motors being operatively connected to said lines respectively, and wherein said follow-up cylinder actuating means further comprises a pair of bypasses connected to the respective lines around the respective motors, and a check valve connected to each of said bypasses.

7. The steering system as recited in claim 6, wherein said check valves are so arranged that said motors are actuated by fluid drained from said steering cylinder means.

8. The steering system as recited in claim 6, wherein said check valves are so arranged that said motors are actuated by fluid being supplied from the first recited source to said steering cylinder means.

9. The steering system as recited in claim 8, wherein said second sources are adapted to draw fluid from said lines respectively.